455-618 AU 233 EX
FIP8106 OR 2,557,974

EXAMINER 61064 (1) 51

June 26, 1951 P. J. KIBLER 2,557,974

LIGHT MODULATION SYSTEM

Filed Aug. 13, 1945 3 Sheets-Sheet 1

INVENTOR
PAUL J. KIBLER

BY [signature]

ATTORNEY

EXAMINER

June 26, 1951 P. J. KIBLER 2,557,974

LIGHT MODULATION SYSTEM

Filed Aug. 13, 1945 3 Sheets-Sheet 2

INVENTOR
PAUL J. KIBLER

BY [signature]

ATTORNEY

EXAMINER

June 26, 1951 P. J. KIBLER 2,557,974

LIGHT MODULATION SYSTEM

Filed Aug. 13, 1945 3 Sheets-Sheet 3

INVENTOR
PAUL J. KIBLER
BY [signature]
ATTORNEY

EXAMINER

Patented June 26, 1951

2,557,974

UNITED STATES PATENT OFFICE 2,557,974

LIGHT MODULATION SYSTEM

Paul J. Kibler, Fort Wayne, Ind., assignor, by mesne assignments, to Farnsworth Research Corporation, a corporation of Indiana Application August 13, 1945, Serial No. 610,641

5 Claims. (Cl. 250—7)

This invention relates generally to signalling systems, and particularly relates to a light modulation system embodying a supersonic light valve arranged for modulating a light beam in accordance with a modulated carrier signal.

A light modulation system conventionally includes a light valve such, for example, as a Kerr cell for modulating a light beam in accordance with a signal. A Kerr cell comprises a suitable liquid such as nitrobenzene in which an electric field is set up by means of two spaced electrodes. The liquid in the cell will rotate the plane of polarization of light passing therethrough in accordance with the electric field strength. Thus, by employing a crossed polarizer and analyser the light transmitter through the cell may be modulated. A Kerr cell, however, has the drawback that its interelectrode capacitance is comparatively high resulting in a poor high frequency response or, alternatively, necessitating the use of a large driving power. A further disadvantage of a Kerr cell when used as a light valve is its inability to modulate a large light flux due to the small distance between the electrodes which is necessary for high efficiency.

It is an object of the present invention, therefore, to provide, in a signalling system for the transmission of signals on a modulated light beam, a light valve having a low capacitance for modulating the light beam in accordance with a modulated high frequency carrier signal.

A further object of the invention is to provide a light modulation system including a supersonic light valve for modulating a light beam having a large light flux in accordance with a modulated carrier signal.

In accordance with the present invention, there is provided a light modulation system comprising a source of a modulation signal, a source of a subcarrier signal having its amplitude modulated in accordance with the modulation signal and a source of a carrier signal having its amplitude modulated in accordance with the modulated sub-carrier signal. A light valve is provided comprising an elastic transparent medium. Means are provided for propagating mechanical waves through the medium under control of the modulated carrier signal so that the mechanical waves have a frequency equal to that of the carrier signal and have their amplitude modulated in accordance with the modulated subcarrier signal. Means are provided for projecting spaced beams of parallel light through the medium in a direction substantially parallel to the light is diffracted in accordance with the modulated subcarrier signal. Finally, means are provided for segregating the diffracted light component from the undiffracted light component.

For a better understanding of the invention, together with other and further objects thereof, reference is made to the following description, taken in connection with the accompanying drawings, and its scope will be pointed out in the appended claims.

Figure 1:
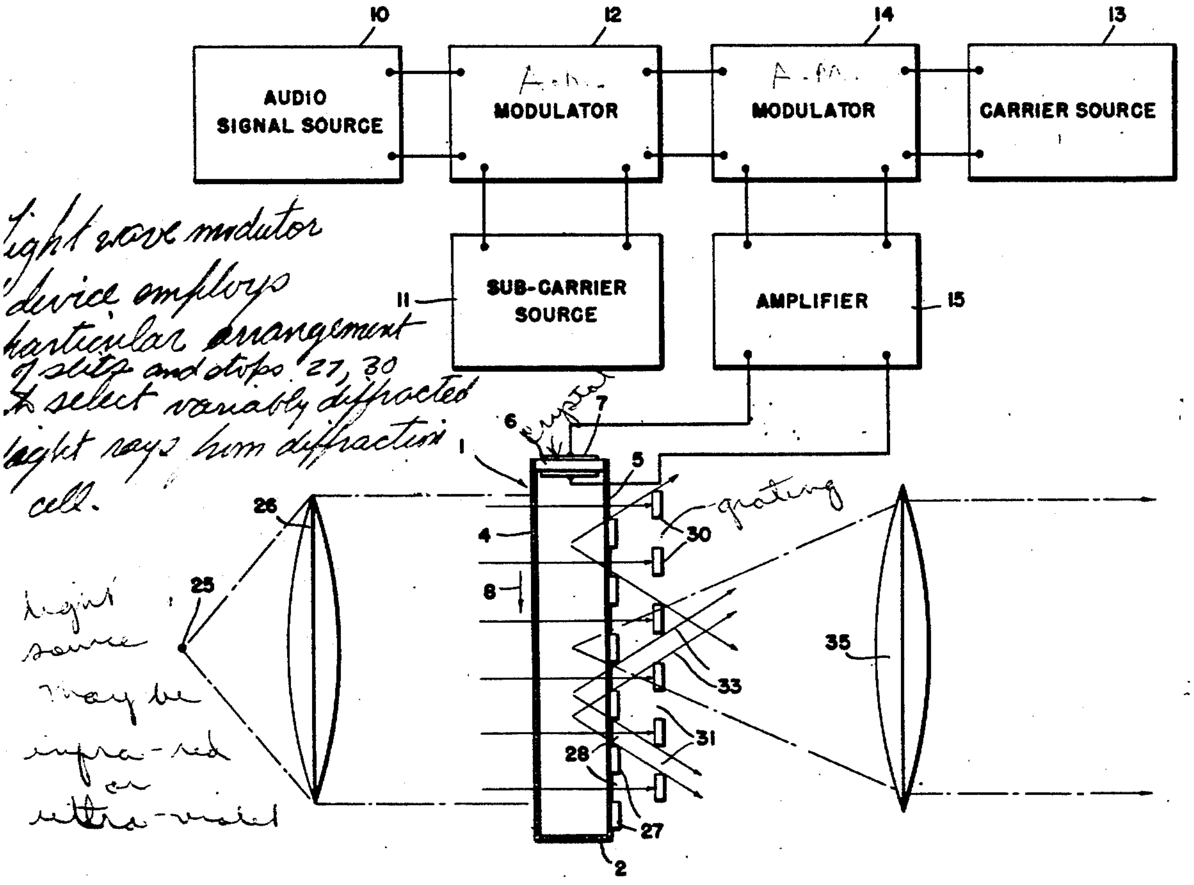
Fig. 1 is a schematic representation, partly in block form, of a light modulation system including a supersonic light valve embodying the present invention.

Referring now more particularly to Fig. 1 of the drawings, there is illustrated supersonic cell 1 comprising container 2 filled with a suitable elastic transparent medium such as liquid 3. Container 2 may, for example, be filled with water, heptane or butyl bromide wherein the velocity of sound is 1,494 meters per second, 1,165 meters per second and 1,016 meters per second, respectively. Container 2 has two opposed windows 4 and 5 through which light may be projected. The dimensions of container 2 may, for example, be 2½ x 1½ x 1½ cm. A mechanical vibratory element, such as piezoelectric quartz crystal 6, is provided at one end of container 2 in such a manner that one of its surfaces is in contact with liquid 3. Two opposed surfaces of piezoelectric crystal 6 are provided with electrodes 7, 7 for setting the crystal into mechanical vibrations under control of the voltage applied to electrodes 7. The mechanical dilations and contractions of piezoelectric crystal 6 are communicated to liquid 3 to set up mechanical compressional waves of high frequency, usually referred to as supersonic waves, which are propagated through liquid 3 in a direction away from crystal 6, as indicated by arrow 8. The supersonic waves may be absorbed or attenuated at the wall of container 2 opposite crystal 6 by any suitable means such as layers of fine mesh wire screens or layers of cork, as is well known in the art.

Piezoelectric crystal 6 is excited in accordance with a carrier signal modulated by a modulated subcarrier signal. For the purpose of supplying a voltage for exciting piezoelectric crystal 6, there is provided a modulation signal source, such as audio signal source 10. The audio signal developed by signal source 10 is impressed upon modulator 12 for modulating a subcarrier wave of constant frequency developed by source 11 and also connected to modulator 12. The output of modulator 12 accordingly is a subcarrier wave modulated in accordance with the audio signal. The modulated subcarrier signal is impressed upon modulator 14 for modulating, in turn, a carrier wave of constant frequency developed by source 13 and connected to modulator 14. Hence, the output of modulator 14 is a carrier signal modulated in accordance with the modulated subcarrier signal. The output of modulator 14 may be amplified by amplifier 15 and its output connected to electrodes 7, 7. Piezoelectric crystal 6, therefore, vibrates in accordance with the modulated carrier signal applied to electrodes 7, 7. The natural frequency of piezoelectric crystal 6 should be substantially equal to the frequency of the carrier signal developed by signal 13.

Figure 2:
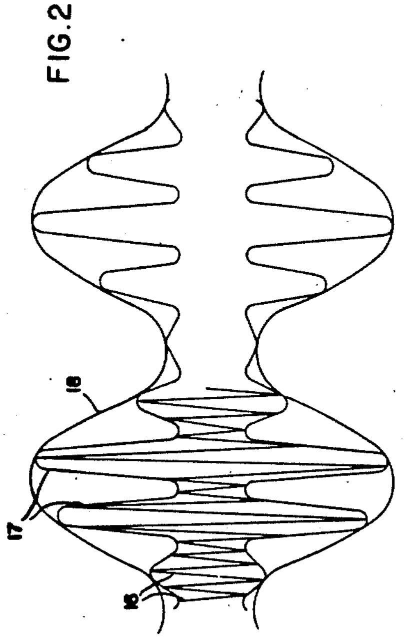
Fig. 2 is a graph illustrating a carrier signal modulated in accordance with a modulated subcarrier signal.

Referring now to Fig. 2, there is illustrated schematically the modulated carrier signal developed by modulator 14. Carrier signal 16, which is of constant frequency, has its amplitude modulated in accordance with modulated subcarrier signal 17 which also has a constant frequency. The amplitude of subcarrier signal 17 is seen to be modulated by audio signal 18 of which two cycles have been illustrated. Audio signal 18 has a variable frequency and amplitude.

The supersonic wave train set up in liquid 3 under the control of the mechanical oscillation of piezoelectric crystal 6 has a frequency corresponding to that of carrier signal 16. The amplitude of the supersonic wave train propagated through liquid 3 is determined by the amplitude of modulated carrier signal 16. This has been illustrated schematically in Fig. 3 where a portion of a supersonic wave train represented by lines 20 has been shown. Lines 20 may, for example, represent the compressional regions of the supersonic waves, as distinguished from the rarefied regions, each corresponding to one-half of a wave of modulated carrier signal 16. The distance, however, between two succeeding lines 20 is equal to the wave length of carrier signal 16 in liquid 3. The intensity of the supersonic waves, that is the amount of compression in each wave, is determined by the amplitudes of that portion of modulated carrier signal 16 which has just been impressed upon electrodes 7. These intensities have been represented schematically by the length of each line 20. It is to be understood, however, that actually each plane supersonic wave has the same width in liquid 3 between windows 4 and 5 and only its intensity varies. The supersonic wave train represented by lines 20 in Fig. 3 will propagate through liquid 3 at sound velocity. Changes of the amplitude and frequency of audio signal 18 are not illustrated in Fig. 3 for a reason which will be explained hereinafter.

As pointed out hereinabove, it is well known that supersonic waves traveling through a transparent medium act in the manner of a diffraction grating. The compressional regions and the rarefied regions of each supersonic wave vary the index of refraction of the light passing therethrough or the velocity of the light. Hence, interference results between adjacent light rays, and the light is diffracted. The amount of light found in the different orders of diffraction depends upon the intensity of the supersonic wave through which the light travels.

In accordance with the present invention, this effect is utilized for modulating a light beam in accordance with a modulated subcarrier signal. To this end parallel light is projected through supersonic cell 1 in a direction parallel to the wave fronts of the supersonic waves. As illustrated in Fig. 1, there is provided light source 25, the light of which is made parallel by lens system 26 and projected through supersonic cell 1 so that the light passes parallel to the wave fronts of the supersonic waves in liquid 3. A series of opaque bars 27 having slots 28 therebetween is arranged adjacent optical window 5 for intercepting a portion of the light passing through supersonic cell 1. In accordance with the invention, the width of each bar 27 is equal to the width of each slot 28. This width in turn is equal to one-half the wave length of the supersonic waves traveling through liquid 3 and having the frequency of the subcarrier signal.

We may assume that the highest frequency of the audio signal developed by source 10 is ten kilocycles per second. The frequency of the subcarrier signal developed by source 11 may be one megacycle per second, while the frequency of the carrier signal developed by source 13 may be ten megacycles per second. We may also assume that the velocity of sound through liquid 3 is 1,000 meters per second. In that case the wave length of the subcarrier signal in liquid 3 is $$\lambda_{s'}=\frac{10^3}{10^6}\text{m.}=1\text{ mm.}$$

for the above values. Accordingly, the width of each bar 27 and the width of each slot 28 is equal to .5 mm.

Figure 3:
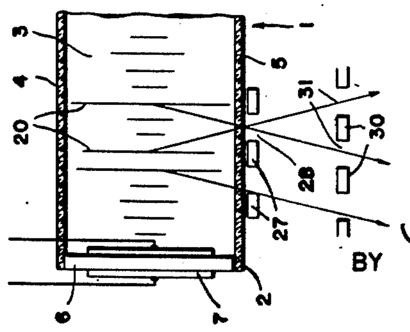
Fig. 3 is a plan view of a supersonic light cell on enlarged scale illustrating diffraction of the light by an amplitude modulated supersonic wave train in the light cell, and associated means for segregating the undiffracted from the diffracted light component.

Therefore, slots 28 expose at any instant one-half a wave length of modulated subcarrier signal 17, as illustrated more clearly in Fig. 3. In view of the fact that the frequency of the carrier signal is considerably above that of the subcarrier signal, a number of carrier waves are exposed at any time through each slot 28. Thus, if the frequency of subcarrier signal 17 is one megacycle per second and that of carrier signal 16 ten megacycles per second, five supersonic waves will be exposed at any instant through each slot 28. Since the supersonic wave train travels across liquid 3 at sound velocity, that is, at 1,000 meters per second, the amplitudes of the compressional waves exposed through slots 28 will show a sinusoidal variation in time corresponding to that of the modulated subcarrier signal. The length of container 2 should be such that at any instant no more than a fraction of one cycle of audio signal 18 is present in liquid 3. Otherwise the light beam would be modulated at any instant by the mean value of the audio signal over a certain time interval. We have assumed the highest audio frequency to be ten kilocycles per second and accordingly its wave length in liquid 3 will be $$\frac{10^3}{10^4}\text{ m.}=10\text{ cm.}$$

As stated above, the length of container 2 is 2½ cm. so that at any instant only a fraction of one cycle of the audio signal is present in container 2.

The supersonic waves traveling through liquid 3 segregate the light passing through cell 1 into an undiffracted and a diffracted component. The intensity of the diffracted light component is directly proportional to the amplitudes of the supersonic waves. In order to segregate the undiffracted light component from the diffracted light component, there is provided a second series of opaque bars 30 having slots 31 therebetween. The width of bars 30 and slots 31 is equal to that of bars 27 and slots 28. Bars 30 are arranged to intercept substantially all light which has not been diffracted and, on the other hand, bars 27 and 30 are arranged to pass the diffracted light therebetween. Accordingly, when no supersonic waves travel through liquid 3, no light should pass between bars 27 and 30 because there would be no diffracted light in that case.

It is well known that the angle of the first diffraction order $\alpha$ for an optical grating is given by the formula $$\sin\alpha=\frac{\lambda_L}{b}$$

Where $\lambda_L$ is the wave length of the light and $b$ the distance between the lines of the grating. When the optical diffraction grating is represented by a supersonic wave train, the formula becomes $$\sin\alpha=\frac{\lambda_L}{\lambda_{S''}}$$

where $b$ is replaced by $\lambda_{S''}$, the wave length of the supersonic wave in liquid 3, that is, the distance between the waves. $\lambda_L$ must be taken as the wave length of the light in liquid 3. $\lambda_{S''}$ is the wave length of the supersonic wave in liquid 3 corresponding to the carrier frequency. From this formula the angle of the first diffraction order may be calculated.

Figure 4:
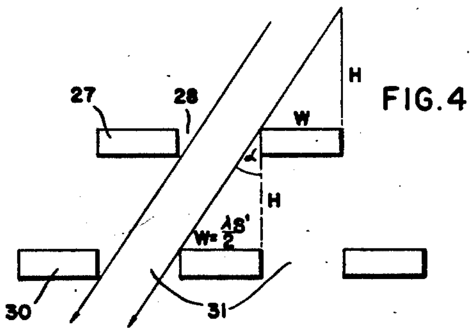
Fig. 4 illustrates schematically two series of light intercepting bars to explain their geometric arrangement.

Bars 27 and 30 must be spaced in such a manner that light of the first diffraction order is able to pass through slots 28 and 31. For the following calculations reference is made to Fig. 4. The width of each bar 27 or 30 is $$w=\frac{\lambda_{S'}}{2}$$

where $\lambda_{S'}=1$ mm., the wave length of the subcarrier signal in liquid 3. $h$, the distance between bars 27 and 30 or the distance between bars 27 and the center of cell 2, may be calculated as follows:

$$\tan\alpha=\frac{w}{h}=\frac{\lambda_{S'}}{2h};\ h=\frac{\lambda_{S'}}{2\tan\alpha}$$

For very small angles $\alpha$, $\tan\alpha=\sin\alpha$, and, therefore, $$h=\frac{\lambda_{S'}}{2\sin\alpha}=\frac{\lambda_{S'}\lambda_{S''}}{2\lambda_L}$$

According to this relationship the distance between the two series of bars 27 and 30 may be calculated.

Arrows 33 in Fig. 1 indicate light corresponding to the first diffraction order passing through slots 28 and 31. On the other hand, the undiffracted light is intercepted by bars 27 and 30. The diffracted light is collected by lens system 35 which has its focal point in supersonic cell 1 and develops a beam of parallel light. The parallel light emerging from lens system 35 is modulated in accordance with the modulated subcarrier signal. It will be obvious that no modulation occurs in accordance with the carrier signal because the modulation of the light is determined by the amplitude of the supersonic waves.

It is also feasible to arrange one series of bars 27 or 30 between light source 25 and supersonic cell 1. To this end bars 30 may, for example, be arranged between light source 25 and optical window 4 in the same relative position with respect to the light beam. The action of supersonic cell 1 would be the same as described hereinbefore. On the other hand, it is also feasible to utilize the undiffracted component of the light instead of the diffracted light component. It will be understood that both the undiffracted and the diffracted light component are modulated in accordance with the modulated subcarrier signal but in opposite sense. In order to utilize the undiffracted light component it is necessary to intercept the diffracted light component while passing the undiffracted light component. This may be effected by shifting bars 30 to the right or left of Fig. 4 by the distance $w$ so that the distance $h$ between bars 27 and 30 remains the same. In that case the diffracted light is intercepted but the undiffracted light is passed.

Figure 5:
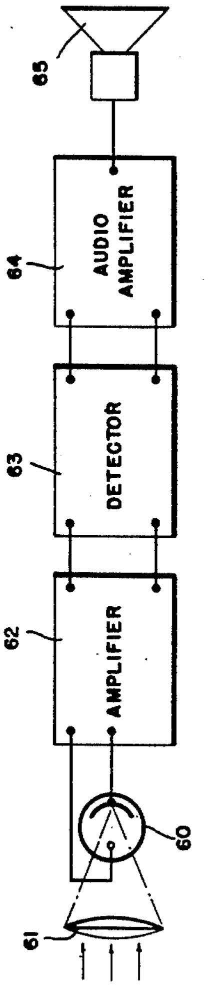
Fig. 5 is a schematic representation in block form of a receiver arranged for receiving a light beam modulated by the light valve of Fig. 1 and for translating the modulation of the light beam into an audible signal.

Referring now to Fig. 5, there is illustrated schematically a receiver arranged for receiving a light beam modulated by supersonic cell 1 of Fig. 1. For the purpose of translating the intensity modulation of the light into electric current variations, there is provided photoelectric cell 60. Parallel light, which may be the modulated light emerging from lens system 35 of Fig. 1, is focused on photoelectric cell 60 by lens system 61. The electric signal derived from photoelectric cell 60 is amplified by amplifier 62, detected by detector 63 and may be further amplified by audio amplifier 64 connected in turn to loud speaker 65. Thus, the audio signals developed by audio signal source 10 may be reproduced at a distance by loud speaker 65.

Figure 6:
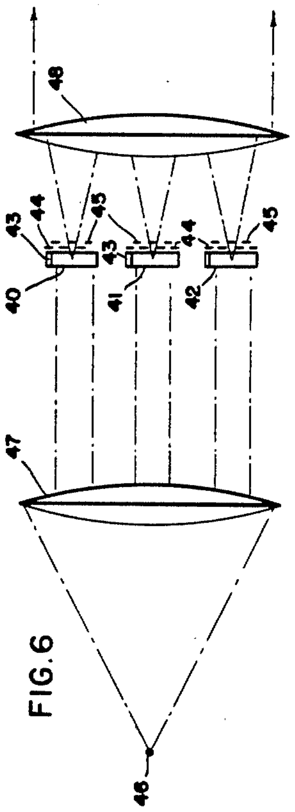
Fig. 6 illustrates schematically a plurality of supersonic light valves arranged for simultaneously modulating a plurality of light beams.

Referring now to Fig. 6, there is illustrated schematically a multiplex light modulation system. To this end there are provided three supersonic cells 40, 41 and 42 each of which may be identical to supersonic cell 1. Each of cells 40, 41 and 42 is provided with a driver crystal 43 and two series of spaced opaque bars 44 and 45 which may be identical to bars 27 and 30. However, the distance between bars 44, 45 and their width are different for each cell 40, 41 and 42. Light from light source 46 is transformed by lens system 47 into a beam of parallel light projected through supersonic cells 40, 41 and 42. Each of the piezoelectric driver crystals 43 may be excited in accordance with a carrier signal modulated in turn by a different audio modulated subcarrier signal. Thus, the individual light beams obtained from supersonic cells 40, 41 and 42 are each modulated in accordance with a different subcarrier signal modulated in turn by a different audio signal. Thus, since the distance between bars 44 and 45 and the width thereof depends upon the wave length of the subcarrier signal, the dimensions are different from each cell 40, 41 and 42. The frequency of the carrier signal may be the same for each driver crystal 43. Lens system 48 has its focal point in supersonic cells 40, 41 and 42 and develops an output beam of parallel light which is modulated in accordance with the modulated subcarrier signals impressed upon the three driver crystals 43.

Figure 7:
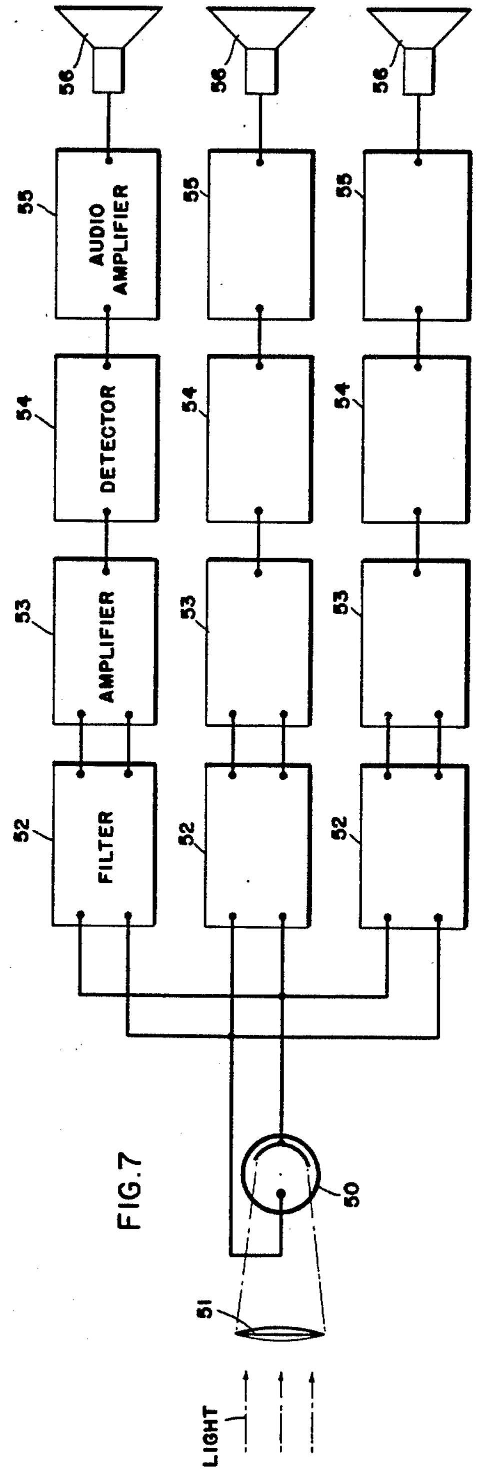
Fig. 7 is a schematic representation in block form of a receiver arranged for receiving simultaneously a plurality of modulated light beams and for translating the modulation of the light beams into audible signals.

The light beam developed by the modulation system of Fig. 6 may be received by the receiver illustrated schematically in Fig. 7. To this end there is provided photoelectric cell 50 upon which parallel light may be focused by lens system 51. The light focused on photoelectric cell 50 may be that developed by the light modulation system of Fig. 6. Photoelectric cell 50 translates the intensity modulation of the light into electric current variations. The electric signal derived from photoelectric cell 50 is filtered by three different filters 52, each of which may be tuned to the subcarrier frequency of one of supersonic cells 40, 41 or 42. The electric signal passed by each electric filter 52 is amplified by amplifier 53, detected by detector 54 and may be further amplified by audio amplifier 55 connected in turn to loud speaker 56. It will be seen from an inspection of Fig. 6 that each filter 52 is associated with its individual amplifier 53, detector 54, audio amplifier 55 and loud speaker 56. In this manner three audio signals are here used for modulating three light beams which are separated in accordance with their different subcarrier frequencies and may be separately amplified and reproduced.

It will be obvious that the velocity of sound in a liquid or other transparent elastic medium is dependent upon the temperature. Thus, when the temperature of liquid 3 in supersonic cell 1 changes, the velocity of the sound as well as the wave length of a supersonic wave corresponding to the carrier frequency and to the subcarrier frequency will also vary. Since the width of bars 27 and slots 28, as well as that of bars 30 and slots 31, is based on the wave length of the supersonic waves in liquid 3 corresponding to the subcarrier frequency, slots 28 and 31 will be thrown out of register when the temperature of liquid 3 changes. Furthermore, a change of the liquid temperature will also change the angle of diffraction of the light which is determined by the wave length of the supersonic wave corresponding to the carrier frequency. This drawback, however, may be overcome by keeping liquid 3 at a predetermined constant temperature. This temperature may be chosen above room temperature because the supersonic waves traveling through liquid 3 tend to heat the liquid.

Alternatively, it is feasible to change the frequency developed by subcarrier signal source 11 and carrier signal source 13 in such a manner that the wave lengths of the supersonic waves in liquid 3 remain constant in spite of any changes in temperature. When the modulation system of the invention is used for transmitting signals on a modulated light beam, provision may have to be made at the receiver for properly receiving or filtering the changed frequency of the subcarrier signal. However, the changes in frequency of the subcarrier signal would normally be very small and, therefore, not objectionable.

In view of the fact that the frequency of the subcarrier signal may be comparatively high, it will be seen that a large number of messages may be transmitted simultaneously by using a different subcarrier frequency for each message or modulation signal. Although the light modulation system of the invention is not strictly speaking secret, it may be termed private. Selective equipment is required at the receiver for detecting the audio signals transmitted on one or more subcarrier modulated light beams.

It will also be understood that the light modulation system of the invention is not restricted to the use of visible light. It is feasible to utilize ultra-violet or infra-red light for transmitting the signals. An inspection of the formula for the angle of diffraction of the light as given above will indicate that the diffraction angle increases in direct proportion to the wave length of the light. Thus, when infra-red light is utilized, the angle of diffraction becomes larger with a subsequent reduction of the distance $h$. Furthermore, the use of infra-red light as the transmission medium makes detection of the light beam more difficult for unauthorized persons, thus making the modulation system of the invention more private. Accordingly, the term "light" as used in the appended claims is meant to include ultra-violet and infra-red as well as visible light.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A light modulation system comprising a source of a modulation signal, a source of a subcarrier signal having a frequency that is higher than the highest frequency of said modulation signal, a source of a carrier signal having a frequency that is higher than said subcarrier signal frequency, means for amplitude modulating said subcarrier signal in accordance with said modulation signal, means for amplitude modulating said carrier signal in accordance with said modulated subcarrier signal, a supersonic light valve comprising a liquid, a piezoelectric crystal having a surface in contact with said liquid, means for energizing said crystal in accordance with said modulated carrier signal, thereby to set up supersonic waves in said liquid having a frequency equal to that of said carrier signal and having their amplitude modulated in accordance with said modulated subcarrier signal, means for projecting parallel rays of light through said liquid in a direction substantially parallel to the wave fronts of said supersonic waves, a first series of opaque bars having slots therebetween interposed in the path of said light, means interposed into the path of the light having passed through said slots and said liquid and including a second series of opaque bars having slots therebetween for separating the component of the light undiffracted by said supersonic waves from the component of the light diffracted by said supersonic waves, each of said bars and each of said slots having a width equivalent to one-half the wave length of said subcarrier signal in said liquid, and means for utilizing one of said light components modulated in accordance with said modulated subcarrier signal.

EXAMINER

2. A light modulation system comprising a source of a modulation signal, a source of a subcarrier signal having a frequency that is higher than the highest frequency of said modulation signal, a source of a carrier signal having a frequency that is higher than said subcarrier signal frequency, means for amplitude modulating said subcarrier signal in accordance with said modulation signal, means for amplitude modulating said carrier signal in accordance with said modulated subcarrier signal, a supersonic light valve comprising a liquid, a piezoelectric crystal having a surface in contact with said liquid, means for energizing said crystal in accordance with said modulated carrier signal, thereby to set up supersonic waves in said liquid having a frequency equal to that of said carrier signal and having their amplitude modulated in accordance with said modulated subcarrier signal, means for projecting parallel rays of light through said liquid in a direction substantially parallel to the wave fronts of said supersonic waves, a first series of opaque bars having slots therebetween interposed in the path of said light, a second series of opaque bars having slots therebetween interposed in the path of the light having passed through the slots in said first series of bars and said liquid for intercepting substantially all light undiffracted by said supersonic waves, said slots being arranged for passing light diffracted by said supersonic waves, said bars being arranged parallel to said wave fronts, each of said bars and each of said slots having a width equivalent to one-half the wave length of said subcarrier signal in said liquid, and means for collecting the light diffracted by said supersonic waves, said diffracted light being modulated in accordance with said modulated subcarrier signal.

3. A supersonic light valve comprising an elastic transparent medium, a mechanical vibratory element in contact with said medium, means for energizing said element in accordance with a signal to set up supersonic waves in said medium, means for projecting parallel rays of light through said medium, a first series of opaque members having openings therebetween interposed in the path of light emerging from said medium, and a second series of opaque members having openings therebetween interposed in the path of the light having passed through the openings between said first series of members and through said medium for segrating the component of the light undiffracted by said supersonic waves from the component of the light diffracted by said supersonic waves.

4. A supersonic light valve comprising an elastic transparent medium, a mechanical vibratory element in contact with said medium, means for energizing said element in accordance with a signal to set up supersonic waves in said medium, means for projecting parallel rays of light through said medium, a first series of opaque members having openings therebetween interposed in the path of light emerging from said medium, and a second series of opaque members having openings therebetween interposed in the path of the light having passed through the openings between said first series of bars and through said medium for intercepting substantially all light undiffracted by said supersonic waves, the width of said members being equal to the width of said openings.

5. A supersonic light valve comprising an elastic transparent liquid, a mechanical vibratory element in contact with said liquid, means for energizing said element in accordance with a signal to set up supersonic waves in said liquid, means for projecting parallel light through said liquid in a direction substantially parallel to the wave fronts of said supersonic waves, a first series of opaque bars having slots therebetween interposed in the path of light emerging from said medium, and a second series of opaque bars having slots therebetween interposed in the path of the light having passed through the slots between said first series of bars and through said liquid for intercepting substantially all light undiffracted by said supersonic waves.

PAUL. J. KIBLER.

REFERENCES CITED

The following references are of record in the file of this patent:

UNITED STATES PATENTS

| Number | Name | Date |
|---|---|---|
| 1,792,046 | Skaupy | Feb. 10, 1931 |
| 1,849,488 | Hanna | Mar. 15, 1932 |
| 2,032,588 | Miller | Mar. 3, 1936 |
| 2,153,490 | Wikkenhauser | Apr. 4, 1939 |
| 2,234,320 | Wolff | Mar. 11, 1941 |
| 2,308,360 | Fair | Jan. 12, 1943 |
| 2,415,226 | Sziklai | Feb. 4, 1947 |

FOREIGN PATENTS

| Number | Country | Date |
|---|---|---|
| 262,868 | Italy | Feb. 23, 1929 |
| 493,318 | Great Britain | Oct. 6, 1939 |